US009282134B2

(12) United States Patent
Satoda

(10) Patent No.: US 9,282,134 B2
(45) Date of Patent: Mar. 8, 2016

(54) CONTENT DELIVERY SYSTEM

(71) Applicant: Kozo Satoda, Tokyo (JP)

(72) Inventor: Kozo Satoda, Tokyo (JP)

(73) Assignee: NEC Corporation, Tokyo (JP)

(*) Notice: Subject to any disclaimer, the term of this patent is extended or adjusted under 35 U.S.C. 154(b) by 296 days.

(21) Appl. No.: 13/823,471

(22) PCT Filed: Nov. 16, 2012

(86) PCT No.: PCT/JP2012/007372
§ 371 (c)(1),
(2) Date: Mar. 14, 2013

(87) PCT Pub. No.: WO2013/094118
PCT Pub. Date: Jun. 27, 2013

(65) Prior Publication Data
US 2015/0237105 A1    Aug. 20, 2015

(30) Foreign Application Priority Data

Dec. 21, 2011 (JP) ................................. 2011-279213

(51) Int. Cl.
*G06F 15/16* (2006.01)
*H04L 29/06* (2006.01)
*H04L 29/08* (2006.01)
(Continued)

(52) U.S. Cl.
CPC .............. *H04L 65/80* (2013.01); *H04L 65/607* (2013.01); *H04L 67/1095* (2013.01); *H04N 21/23805* (2013.01); *H04N 21/64738* (2013.01)

(58) Field of Classification Search
CPC ..... H04L 65/601; H04L 65/80; H04L 65/607; H04L 67/1095; H04N 21/6373; H04N 21/23805; H04N 21/64738

USPC ................. 709/223, 224, 231, 233, 234, 218; 370/230; 455/68; 386/46
See application file for complete search history.

(56) References Cited

U.S. PATENT DOCUMENTS

| 7,581,019 B1 | 8/2009 | Amir et al. | |
| 8,280,994 B2* | 10/2012 | Blouin et al. | 709/223 |
| 8,588,065 B2* | 11/2013 | Liu et al. | 370/230 |

(Continued)

FOREIGN PATENT DOCUMENTS

| JP | 2007-221318 A | 8/2007 |
| JP | 2011-019068 A | 1/2011 |

(Continued)

OTHER PUBLICATIONS

U.S. Appl. No. 13/389,767, filed Feb. 2012, Yoshida, Hiroshi.*

(Continued)

*Primary Examiner* — Jungwon Chang
(74) *Attorney, Agent, or Firm* — Foley & Lardner LLP

(57) ABSTRACT

The server device 100 transmits media data of a media rate, calculated by the rate output means 102, to the client device 200 at a transmission rate calculated by the rate output means 102. The rate output means 102 uses an objective function, which uses a media rate and a transmission rate as variables and determines an evaluation value evaluating a combination of QoE and a delivery cost so as to correspond to the variables, and predetermined constrains, to calculate a combination of a media rate and a transmission rate with which the evaluation value is the highest. The client device 200 reproduces content based on the media data transmitted from the server device 100.

10 Claims, 7 Drawing Sheets

(51) Int. Cl.
*H04N 21/238* (2011.01)
*H04N 21/647* (2011.01)

(56) References Cited

U.S. PATENT DOCUMENTS

| | | | |
|---|---|---|---|
| 8,880,689 B2 * | 11/2014 | Yamanaka et al. | 709/224 |
| 2009/0060448 A1 * | 3/2009 | Hosokawa | 386/46 |
| 2010/0248643 A1 * | 9/2010 | Aaron et al. | 455/68 |
| 2011/0276714 A1 * | 11/2011 | Yoshida | 709/233 |
| 2012/0150936 A1 | 6/2012 | Yoshida | |

FOREIGN PATENT DOCUMENTS

| | | |
|---|---|---|
| JP | 2011-061533 A | 3/2011 |
| WO | WO 2011/018868 A1 | 2/2011 |

OTHER PUBLICATIONS

Extended European Search Report mailed Aug. 11, 2015 in related European Appl. No. 12860913.8 (9 pgs.).

* cited by examiner

CONTENT DELIVERY SYSTEM

This application is the National Phase of PCT/JP2012/007372, filed Nov. 16, 2012, which claims priority to Japanese Application No. 2011-279213, filed Dec. 21, 2011, the disclosures of which are hereby incorporated by reference in their entirety.

TECHNICAL FIELD

The present invention relates to a content delivery system for delivering content, and in particular, to a content delivery system allowing optimum content delivery while considering users' QoE (Quality of Experience) and a delivery cost.

BACKGROUND ART

Along with the development of broadband networks and high-performance information terminals such as mobile telephones and PCs, services of delivering content such as large volume videos and music over networks are increasing.

In a video delivery service, when videos of SD (Standard Definition) quality are transmitted, a large quantity of data communications of about 6 Mbps (data quantity of 6 megabits per second) are required for MPEG-2 (Motion Picture Expert Group-2). If any data loss or communication delay occurs during communications, videos may be distorted or video reproduction may be stopped due to delayed arrival of videos, which degrades the user's QoE. As such, a conventional video delivery service has been performed in such a manner that a communication provider secures a large-capacity band in order to ensure QoS (Quality of Service) so as to prevent data loss from arising on the way.

However, along with the widespread use of broadband Internet in recent years, video delivery services over networks, in which QoS is not assured such as the Internet, are increasing. The Internet has characteristics that an available network band varies depending on communications of other users. Further, higher-speed mobile networks brought about by LTE (Long Term Evolution) or the like and higher-performance terminals resulting from widespread use of smartphones are outstanding. As such, needs for viewing videos using mobile networks are increasing. Mobile networks have characteristics that a network band varies widely depending on, in addition to communications of other users, variations in the radio field intensity between a base station and a user terminal caused by the movement of the user, and effects of other wireless devices.

A delivery service for transmitting media data (data representing content) over such networks, in which QoS is not assured, is disclosed in Patent Document 1.

In the case of transmitting media data over a network in which QoS is not assured, when the band which is available in the network (available band) is narrowed, the entire media data cannot be transmitted. As such, videos may be distorted due to a packet loss, or reproduction of media data may be stopped due to delayed arrival of packets. Distortion of media data and stop of reproduction of media data cause user dissatisfaction, whereby the user's QoE is degraded.

In order to cope with such a problem, Patent Document 1 discloses a technology which uses a transmission rate and a media rate, when transmitting media data from a server device to a client device, as variables, and calculates a combination of a transmission rate and a media rate with which the QoE becomes the highest, based on an objective function associating those variables with QoE, and predetermined constraints. More specifically, among combinations of media rates and transmission rates satisfying the constraints, a combination of a media rate and a transmission rate with which the value of an objective function becomes the smallest is calculated. Then, media data of the calculated media rate is transmitted from the server device to the client device at the calculated transmission rate. Here, a transmission rate is a quantity of media data which is transmitted per unit time, and a media rate is a quantity of media data which is required for reproducing content for a unit time at a constant speed.

In the above-described objective function, the value thereof becomes smaller as the transmission rate is lower or the media rate is higher. Further, the above-described constraints include a limitation that a transmission rate does not exceed an available band and a condition that a media rate is any one of predetermined media rates.

By setting an objective function such that the value thereof becomes smaller as the transmission rate is lower, a lower transmission rate is selected preferentially, and a probability that congestion is caused in the network can be lowered, so that occurrence of a packet loss can be reduced. Further, by setting an objective function such that the value thereof becomes smaller as the media rate is higher, a higher media rate is selected preferentially, so that the content quality can be improved. As such, the technique described in Patent Document 1 is able to improve QoE.

Patent Document 1: WO 2011/018868

SUMMARY

The technology described in Patent Document 1 is able to improve QoE. However, as the technology described in Patent Document 1 merely selects a combination of a transmission rate and a media rate capable of improving QoE (a combination of a transmission rate and a media rate which satisfy constrains and allow the value of an objective function to be the smallest) as much as possible, there is a problem that it is impossible to make the cost for delivering content (delivery cost) appropriate.

For example, in the case of reproducing content by streaming, in order to sequentially reproduce content seamlessly even if the traffic or the like of the network varies, it is necessary to store media data not having been reproduced for a predetermined time period in the client device. Meanwhile, the user of the client device is free to stop viewing of the content, and if the user stops viewing in the middle of the content, the media data stored in the client device and not having been reproduced is discarded. As such, if the user stops viewing in the middle of the content, it means that the delivery cost was used to deliver useless media data. In the technology described in Patent Document 1, as media data of a high media rate is preferentially transmitted from a server device to a client device, a larger quantity of media data not having been reproduced is stored in the client device. As such, if the user stops viewing in the middle of the content, it means that a larger delivery cost was used for delivering a larger quantity of useless media data.

As such, an object of the present invention is to provide a delivery system in which a problem that it is impossible to make the delivery cost for delivering content appropriate, if QoE is improved, is solved.

A content delivery system, according to an aspect of the present invention, is a content delivery system including a server device and a client device which are adapted to be communicable with each other, wherein the server device is adapted to be able to transmit media data, formed by encoding content, to the client device, and the client device is adapted to, while receiving the media data transmitted by the server device, store received data of the media data in a media reproduction buffer, read stored media data from the media reproduction buffer, and reproduce the content.

The content delivery system further includes a rate output means for calculating and outputting a combination of a transmission rate and a media rate based on an objective function, the transmission rate representing a quantity of the media data transmitted per unit time by the server device, the media rate representing a quantity of the media data per unit time, the objective function using the transmission rate and the media rate as variables and determining an evaluation value evaluating a combination of QoE (Quality of Experience), which is a service quality that a user of the client device experiences when viewing the content reproduced by the client device, and a delivery cost representing a cost involved in delivering the media data so as to correspond to the variables; and a media data transmission means for transmitting the media data, encoded at the media rate output from the rate output means, from the server device to the client device at the transmission rate output from the rate output means.

A server device, according to another aspect of the present invention, is a server device adapted to be communicable with a client device and to be able to transmit media data, formed by encoding content, to the client device.

The server device includes a rate output means for calculating and outputting a combination of a transmission rate and a media rate based on an objective function, the transmission rate representing a quantity of the media data transmitted per unit time by the server device, the media rate representing a quantity of the media data per unit time, the objective function using the transmission rate and the media rate as variables and determining an evaluation value evaluating a combination of QoE (Quality of Experience), which is a service quality that a user of the client device experiences when viewing the content reproduced by the client device, and a delivery cost representing a cost involved in delivering the media data so as to correspond to the variables; and a media data transmission means for transmitting the media data, encoded at the media rate output from the rate output means, from the server device to the client device at the transmission rate output from the rate output means.

A client device, according to another aspect of the present invention, is a client device adapted to be communicable with a server device and, while receiving media data transmitted by the server device, store received data of the media data in a media reproduction buffer, read stored media data from the media reproduction buffer, and reproduce content.

The client device includes a rate output means for calculating and outputting a combination of a transmission rate and a media rate based on an objective function, the transmission rate representing a quantity of the media data transmitted per unit time by the server device, the media rate representing a quantity of the media data per unit time, the objective function using the transmission rate and the media rate as variables and determining an evaluation value evaluating a combination of QoE (Quality of Experience), which is a service quality that a user of the client device experiences when viewing the content reproduced by the client device, and a delivery cost representing a cost involved in delivering the media data so as to correspond to the variables.

A delivery method, according to another aspect of the present invention, is a delivery method to be applied to a content delivery system including a server device and a client device which are adapted to be communicable with each other. The server device is adapted to be able to transmit media data, formed by encoding content, to the client device, and the client device is adapted to, while receiving the media data transmitted by the server device, store received data of the media data in a media reproduction buffer, read stored media data from the media reproduction buffer, and reproduce the content.

The delivery method includes calculating and outputting a combination of a transmission rate and a media rate based on an objective function, the transmission rate representing a quantity of the media data transmitted per unit time by the server device, the media rate representing a quantity of the media data per unit time, the objective function using the transmission rate and the media rate as variables and determining an evaluation value evaluating a combination of QoE (Quality of Experience), which is a service quality that a user of the client device experiences when viewing the content reproduced by the client device, and a delivery cost representing a cost involved in delivering the media data so as to correspond to the variables; and transmitting the media data, encoded at the output media rate, from the server device to the client device at the output transmission rate.

According to the present invention, it is possible to achieve an advantageous effect of improving QoE while reducing the delivery cost.

EXEMPLARY EMBODIMENTS

Hereinafter, exemplary embodiments of the present invention will be described in detail with reference to the drawings.

First Exemplary Embodiment

Figure 1:
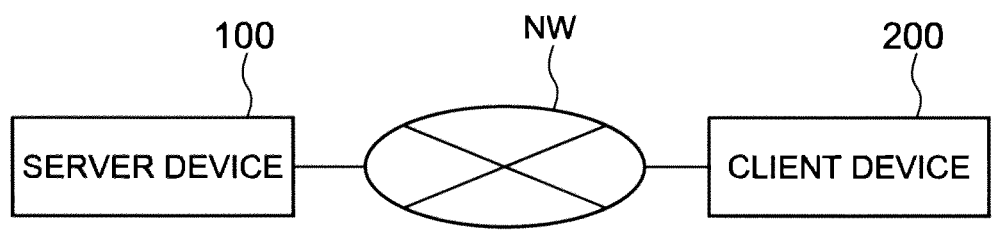
FIG. 1 is a block diagram showing the schematic configuration of a content delivery system according to a first exemplary embodiment of the present invention.

As shown in FIG. 1, a content delivery system according to a first exemplary embodiment of the present invention includes a server device 100 and a client device 200. The server device 100 and the client device 200 are communicably connected with each other over a network (NW) (e.g., Internet, carrier network, or mobile network).

The server device 100 includes a central processing unit (CPU) and storing units (memory and HDD (Hard Disk Drive)), not shown. The server device 100 is adapted to realize the functions described below by means of execution of a program, stored in the storing unit, by the CPU.

The client device 200 is a personal computer. It should be noted that the client device 200 may be a mobile telephone, a PHS (Personal Handy-phone System), a PDA (Personal Data Assistant), a smartphone, a tablet terminal, a TV receiver, a set top box, a game console, a car navigation device, or the like.

The client device 200 includes a central processing unit (CPU), a storing unit (memory), input devices (e.g., keyboard, mouse, and the like), and output devices (e.g., display, speaker, and the like), not shown. The client device 200 is adapted to realize the functions described below by means of execution of a program, stored in the storing unit, by the CPU.

Figure 2:
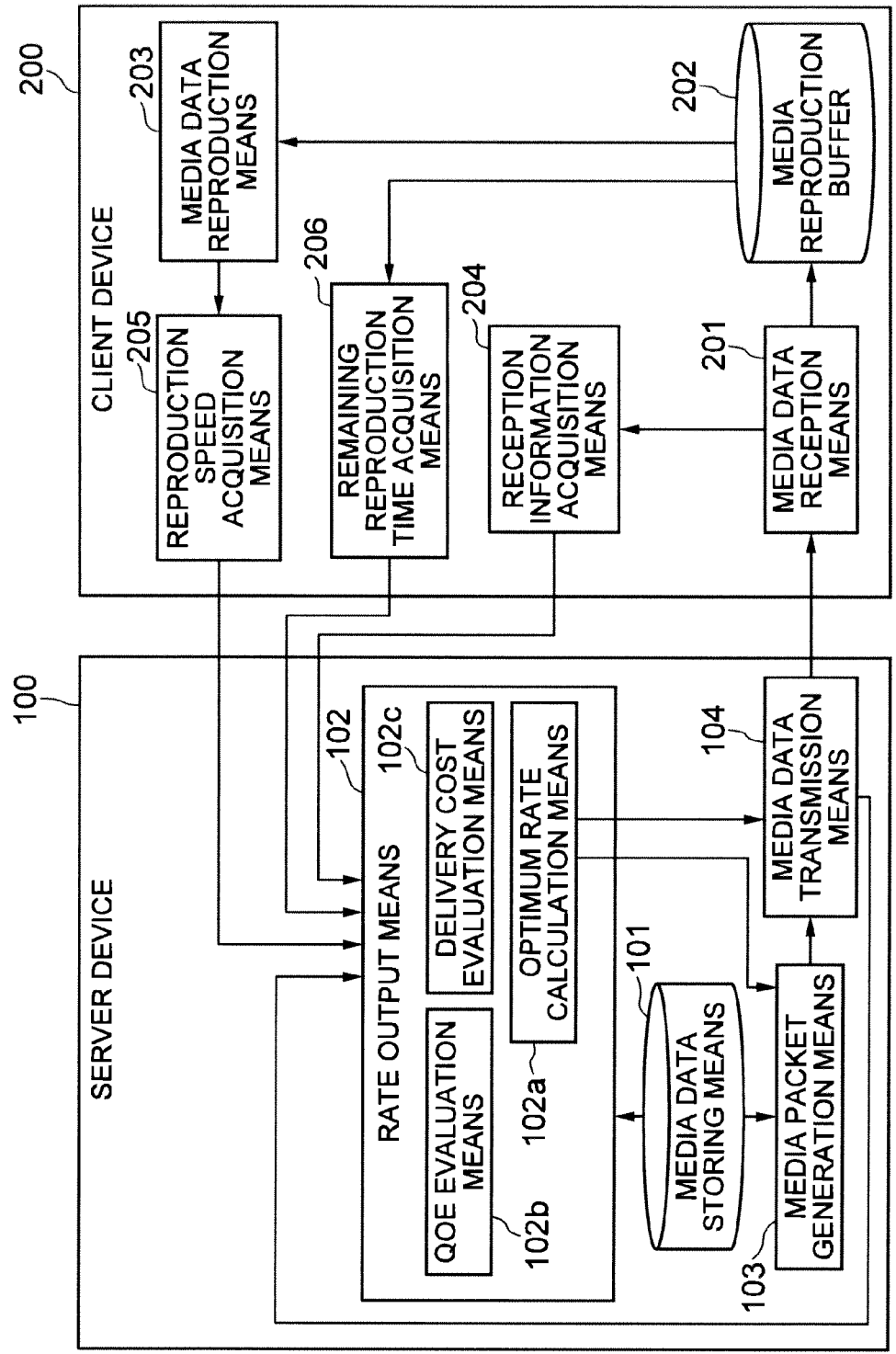
FIG. 2 is a block diagram showing functions of the content delivery system according to the first exemplary embodiment of the present invention.

FIG. 2 is a block diagram showing functions of a distribution system configured as described above. These functions are realized by means of execution of a program shown by the flowchart of FIG. 3, to be described below, and the like, by the CPU of the server device 100, and by means of execution of a predetermined program by the client device 200.

[Configuration of Server Device 100]

The server device 100 includes a media data storing means 101, a rate output means 102, a media packet generation means 103, and a media data transmission means 104. The rate output means 102 includes an optimum rate calculation means 102a, a QoE (Quality Experience) evaluation means 102b, and a delivery cost evaluation means 102c.

The respective means of the server device 100 operate as described below.

The media data storing means 101 stores one or more pieces of media data. Media data is data formed by encoding content (including media such as one or more pieces of video data, audio data, subtitles data, and the like). In general, each medium is compressed by a video compression method or an audio compression method in order to compress the quantity of data, and encoded. In the present embodiment, with respect to one content, a plurality of pieces of media data of different media rates are stored. A media rate is a quantity of data (data size, that is, the number of bytes or bits, for example) per unit time of encoded content. In other words, a media rate is a quantity of media data required for reproducing content for a unit time at a constant speed (reproducing at a single speed).

The rate output means 102 outputs a transmission rate and a media rate corresponding to a state of the server device 100, a state of the client device 200, a state of a network NW linking the server device 100 and the client device 200, and the like. A transmission rate is a quantity of data (data size, e.g., the number of bytes) to be transmitted by the server device 100 to the client device 200 per unit time (e.g., one second). The details of the rate output means 102 will be described below.

The media packet generation means 103 acquires media data which corresponds to the content to which a delivery request is made from the client device 200, and is encoded at a media rate output from the rate output means 102. Then, in order to transmit the acquired media data to the client device 200, the media packet generation means 103 generates media packets.

The media data transmission means 104 outputs the media packets, generated by the media packet generation means 103, to the client device 200 in such a manner that a quantity of data transmitted per unit time conforms with the transmission rate output from the rate output means 102. In the present embodiment, it is assumed that a content file in 3GP file format provided by 3GPP, in MP4 file format provided by ISO/IEC, in AVI format, or the like, is divided into packets, and transmitted using HTTP (Hyper Text Transfer Protocol) or TCP/IP. However, the present invention is not limited to these examples. It is also possible to generate and transmit media packets using another method or protocol, such as transmitting them using RTP (Real-Time Transport Protocol) or UDP/IP.

[Configuration of Client Device 200]

The client device 200 includes a media data reception means 201, a media reproduction buffer 202, a media data reproduction means 203, a reception information acquisition means 204, a reproduction speed acquisition means 205, and a remaining reproduction time acquisition means 206.

The respective means of the client device 200 operate as described below.

The media data reception means 201 receives media packets transmitted from the server device 100, and stores the media data, included therein, in the media reproduction buffer 202.

The media data reproduction means 203 reads and reproduces the media data stored in the media reproduction buffer 202, and presents them to the user via an output device not shown. The media data reproduction means 203 is also able to change the reproduction speed in accordance with an input of an instruction relating to the reproduction speed such as constant-speed reproduction, slow reproduction, double-speed reproduction, or rewind, which is input via an input device not shown.

This means that as the client device 200 is adapted to, while storing media data from the server device 100, received by the media data reception means 201, in the media reproduction buffer 202, reproduce media data which is stored in the media reproduction buffer 202 and has not been reproduced, by the media data reproduction means 203, the client device 200 is able to reproduce media data before the entire data has been downloaded. As such, the client device 200 is able to reproduce media data by means of streaming or progressive download. If, during reproduction of media data by means of streaming or progressive download, media data not having been reproduced (media data to be reproduced) becomes empty, reproduction of the media data by the media data reproduction means 203 will be stopped. If reproduction of the media data is stopped, the user feels uncomfortable, so that QoE is degraded.

The reception information acquisition means 204 transmits a value calculated by dividing the quantity of the media data, sequentially received by the media data reception means 201, by the reception time period of the media data, to the server device 100 as reception information. For example, if the media data reception means 201 sequentially receives media data of "0.5 megabytes (MB)" in "0.5 seconds" and then cannot receive media data for a given time period, the reception information is [0.5 MB/0.5 seconds=1 (MB/s)]. The calculation processing of the reception information is performed every predetermined period. While it is assumed that media data is received using TCP/IP in the media data reception means 201, it is also possible to use UDP/IP. In the case of using UDP/IP, there is a possibility that media packets transmitted from the server device 100 are lost and cannot be received by the media data reception means 201. In that case, a rate of loss of media packets (rate of occurrence of packet loss) is also acquired and transmitted to the server device 100. For example, in the case of using RTP, a rate of packet loss is calculated by specifying the lost media packets based on the sequence number included in the RTP header.

The reproduction speed acquisition means 205 acquires a reproduction speed of media data reproduced by the media data reproduction means 203 and transmits it to the server device 100. A reproduction speed is a value obtained by converting the quantity of media data reproduced per unit time by the media data reproduction means 203 into a ratio to the quantity of data to be reproduced per unit time in constant-speed reproduction. In other words, a reproduction speed is a value obtained by dividing the quantity of media data reproduced per unit time by the media data reproduction means 203 by the quantity of media data to be reproduced per unit time in constant-speed reproduction. For example, if data for 1 second in media data is reproduced in 1 second, the reproduction speed is "1", which corresponds to the case where the user reproduces it at a constant speed without using fast-forward, slow reproduction, rewind, or the like. If the data is fast forwarded at a double reproduction speed, the reproduction speed is "2", if reproduced slowly at a half speed, the reproduction speed is "0.5", while if inversely reproduced at a constant speed, the reproduction speed is "−1".

The remaining reproduction time acquisition means 206 acquires a period of time during which content is able to be reproduced at a constant speed (remaining reproduction time) by the media data reproduction means 203, based on the portion not having been reproduced (non-reproduced data) of the media data stored in the media reproduction buffer 202, and transmits it to the server device 100. For example, if data for 30 seconds from the beginning of the media data is stored in the media reproduction buffer 202 and data for 20 seconds has been reproduced by the media data reproduction means 203, the remaining reproduction time is 10 seconds (=30 seconds−20 seconds).

In the present embodiment, while it is assumed that the reception information acquisition means 204, the reproduction speed acquisition means 205, and the remaining reproduction time acquisition means 206 transmit data from the client device 200 to the server device 100 using HTTP, it is also possible to transmit data using RTCP (RTP Control Protocol) if RTP is used, or using other protocols.

[Description of Operation of First Exemplary Embodiment]

Next, operation of the present embodiment will be described in detail with reference to the block diagram of FIG. 2 and the flowchart of FIG. 3.

When a user selects content that the user wishes to view in the client device 200 and makes a delivery request for media data from the client device 200 to the service device 100, delivery of the media data begins. At the start of delivering the media data, the server device 100 transmits the media data of a predetermined media rate, at a predetermined transmission rate.

Figure 3:
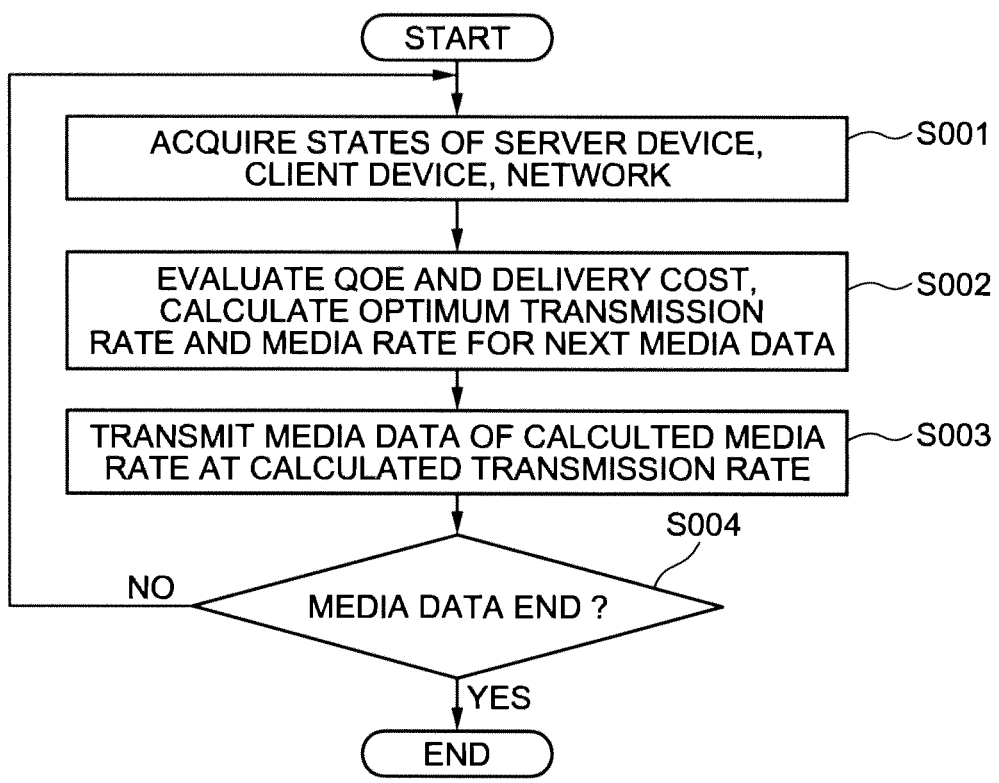
FIG. 3 is a flowchart showing exemplary processing of a rate output means 102 according to the first exemplary embodiment of the present invention.

When delivery of the media data begins, the rate output means 102 acquires the state of the server device 100, the state of the client device 200, and the state of the network NW (step S001 in FIG. 3).

[State of Client Device 200]

In the present embodiment, a state of the client device 200 includes a reproduction speed of the media data transmitted from the reproduction speed acquisition means 205, and a remaining reproduction time of the media reproduction buffer 202 transmitted from the remaining reproduction time acquisition means 206. A state of the client device 200 may also include types and protocols of media which can be reproduced by the client device 200, and a CPU load and available memory of the client device 200.

The state of the client device 200 transmitted from the reproduction speed acquisition means 205 and the remaining reproduction time acquisition means 206 in the client device 200 is input to the rate output means 102 in the server device, over the network NW.

While the present embodiment is configured such that a reproduction speed is transmitted from the reproduction speed acquisition means 205 to the server device 100, it is also possible to transmit the content of an instruction (constant-speed reproduction, slow reproduction, rewind, or the like) relating to the reproduction input by the user of the client device 200. The rate output means 102 is able to estimate the current reproduction speed based on the content of the instruction transmitted from the client device 200. For example, if the content of the instruction is "constant-speed reproduction", the rate output means 102 estimates a reproduction speed "1", while if the content of the instruction is "slow reproduction", the rate output means 102 estimates a reproduction speed "0.5". It is also possible that with a restriction of not allowing trick play such as fast-forward, slow reproduction, and rewind by the client device, the reproduction speed can be fixed to "1". In that case, the reproduction speed acquisition means 205 is unnecessary.

Further, although the present embodiment is configured such that a remaining reproduction time is transmitted from the remaining reproduction time acquisition means 206 to the server device 100, it is also possible to estimate a remaining reproduction time by the rate output means 102 in the following manner, without transmitting a remaining reproduction ti from the remaining reproduction time acquisition means 206.

In general, at the start of reproducing media data, reproduction of the media data is not started until a certain quantity of media data is stored in the media reproduction buffer 202. Here, if a quantity of media data which must be stored in the media reproduction buffer 202 (initial buffer quantity) in order to start reproduction is Bi (seconds), a quantity of media data having been transmitted from the server device 100 during a time period t is dM(t) (bytes), a media rate of the media data is rM(t) (bytes/second), and a reproduction speed in the client device 200 in the time period t is p(t), a remaining reproduction time br(t) (seconds) is represented as Expression (1) shown below. However, until the initial buffer quantity Bi of the media data is stored in the reproduction buffer 202, the reproduction speed p(t)=0.

$$br(t) = \int (dM(t)/rM(t) - p(t))dt \quad (1)$$

Here, it is assumed that the initial buffer quantity Bi is 5 seconds, the reproduction speed p(t) in the client device 200 is 1, and the media data, in which the media rate rM(t) is 1 Mbps (1 megabit (=125 kilobytes) per second), is transmitted 2 megabytes in 10 seconds from the server device 100 to the client device 200.

In this case, as the transmission rate is [2 megabytes (Mbytes)/10 seconds=0.2 (Mbytes/second)], the time required for storing the media data for the initial buffer quantity Bi=5 seconds in the media reproduction buffer 202 is [0.125 (Mbytes/second)*5 (seconds)/0.2 (Mbytes/second)= 3.125 (seconds)]. Accordingly, the remaining reproduction time br (10) is calculated to be 9.125 (seconds) as shown by the following Expression (2).

$$br(10) = 2(Mbytes)/0.125(Mbytes/second) - \quad (2)$$
$$(10 \text{ seconds} - 3.125 \text{ seconds})$$
$$= 16(seconds) - 6.875(seconds)$$
$$= 9.125(seconds)$$

Further, in the case where the user of the client device 200 views the media data at a constant speed for 4 seconds from the time when the user started reproduction of the media data, and then views it at a double speed, the remaining reproduction time br (10) is 3.125 (seconds) as shown by the following Expression (3).

$$br = 2(Mbytes)/0.125(Mbytes/\text{second}) - \\ \{4 \text{ seconds} + (6 \text{ seconds} - 3.125 \text{ seconds}) * 2\} \\ = 16(\text{seconds}) - 9.75(\text{seconds}) \\ = 6.25(\text{seconds})$$ (3)

Here, the quantity of data and the media rate of the media data having been transmitted from the server device 100 to the client device 200 can be measured by the server device 100. As such, if the server device 100 is able to know the reproduction speed p(t) in the client device 200, it is possible to calculate the remaining reproduction time by the rate output means 102, without the remaining reproduction time acquisition means 206. In particular, with a restriction of not allowing trick play such as fast-forward, slow reproduction, and rewind by the client device 200, it is possible to calculate the remaining reproduction time br(t) by fixing the reproduction speed p(t) to "1".

[State of Server Device 100]

A state of the server device 100 may include the number of client devices 200 to which content is delivered simultaneously by the server device 100, a CPU load, available memory, the entire quantity of communications transmitted from the server device 100, a data transfer quantity involved in reading of the media data from the media data storing means 101, and the like. These kinds of information can be acquired using the well-known techniques.

[State of Network NW]

A state of the network NW includes a bandwidth of available band which can be used for transmitting media data from the server device 100 to the client device 200 (which may be simply referred to as available band), and a rate of packets which did not reach the client device 200 because of a packet loss on the network (packet loss rate). The state may also include a rate of congestion of the entire network.

While, in the present embodiment, it is assumed that reception information (value obtained by dividing the quantity of media data sequentially received by the media data reception means 201, by the time period of receiving the media data) transmitted from the reception information acquisition means 204 is handled as an available band, an available band can be calculated in the following manner.

If it is possible to estimate a packet loss rate or it is known that there is no packet loss, an available bandwidth can be calculated by subtracting the quantity of data of packet loss from the quantity of data transmitted from the media data transmission means 104 of the server device 100, so that the reception information acquisition means 204 may be unnecessary. In particular, in the case of transmitting media data using TCP/IP, the lost packets are transmitted again due to the characteristics of TCP/IP so that a packet loss will not occur. As such, an available band can be measured easily from the quantity of transmitted data. In that case, communications from the reception information acquisition means 204 is unnecessary.

Further, it is also possible to acquire an available band by transmitting prove data, which is different from the media data, to the client device 200. As this kind of method, packet train estimation methods such as PathLoad, pathChirp, and the like have been known. It is possible to calculate an available band by means of a packet train estimation method without using the reception information acquisition means 204.

The processing performed at step S001 is as described above.

When the processing of step S001 is completed, the rate output means 102 evaluates the user's QoE and the delivery cost from the states of the server device 100, the client device 200, and the network NW, and calculates a transmission rate and a media rate which are optimum for the media data to be delivered next (step S002 in FIG. 3).

[Evaluation of QoE]

QoE is evaluated by the QoE evaluation means 102b of the rate output means 102. The grounds for degradation of QoE, at the time of viewing content, are as follows.

(a) Packet loss. When a packet loss is caused, videos and audio are degraded.

(b) Shortage of media rate. When a media rate is in short, media quality is degraded. For example, videos are fuzzy, grid noise called block noise is generated, and audio quality deteriorates.

(c) Remaining reproduction time runs out during content reproduction. When the remaining reproduction time runs out, reproduction of content is stopped.

(d) Frequent changes of media rate. If the media rate is changed frequently, media quality varies frequently.

Measures against the grounds (a) to (d) include the followings.

(A) Measures against a packet loss are to prevent the transmission rate from becoming too high. As the transmission rate is lower, the probability of occurrence of congestion can be lower, so that a packet loss can be reduced. As such, it is evaluated that as the transmission rate is lower, QoE is higher.

(B) Measures against a shortage of media rate are to allow the media rate to be higher as much as possible. As the media rate is higher, content quality can be higher. As such, it is evaluated that as the media rate is higher, QoE is higher.

(C) Measures against running out of remaining reproduction time are to prevent the media rate from becoming too high compared with the transmission rate. As the media rate is lower than the transmission rate, the case where the remaining reproduction time runs out is less likely, whereby it is possible to prevent reproduction of content from being discontinued. As such, it is evaluated that as the media rate is lower compared with the transmission rate, QoE is higher.

(D) Measures against frequent changes of media rate are to reduce the frequency of changes of the media rate. As the frequency of changes of the media rate is lower, the frequency of changes of the clearness of the content can be lower. As such, it is evaluated that as the frequency of changes is lower, QoE is higher.

Further, according to the state of the client device 200, it is also possible to prevent selection of media data which cannot be reproduced by the client device 200. If there is no extra room in the CPU or memory of the client device 200 or in the network being used, by selecting media data not placing a reproduction load on the client device 200, it is possible not to degrade the QoE of the user operating the client device 200.

The QoE evaluation means 102b evaluates the QoE by using the media rate and the transmission rate as variables and using an objective function fQ which determines QoE so as to correspond to the variables. The objective function fQ for evaluating QoE is constructed of four items $z1$ to $z4$ relating to the above-described measures (A) to (D). Hereinafter, the objective function fQ will be described. It should be noted that the value of the objective function fQ becomes smaller as the QoE is higher.

It is assumed that at a time t, the media rate and the transmission rate of content transmitted from the server device 100 to the client device 200 is b(t) and v(t), respectively, and the remaining reproduction time and the reproduction speed in the client device 200 is T(t) and p(t), respectively. In that case, the items z1 to z4 relating to the measures (A) to (D) are shown by the following expressions.

The item z1, relating to the measures (A) that "measures against a packet loss are to prevent the transmission rate v(t) from becoming too high", corresponds to reducing the value of the objective function fQ as the transmission rate v(t) is lower. As such, the item z1 is represented by the following Expression (4).

$$z1 = v(t)^2 \quad (4)$$

The item z2, relating to the measures (B) that "measures against a shortage of media rate are to allow the media rate b(t) to be higher as much as possible", corresponds to reducing the value of the objective function fQ as the reciprocal of the media rate b(t) is smaller. As such, the item z2 is represented by the following Expression (5).

$$z2 = 1/b(t)^2 \quad (5)$$

The item z3, relating to the measures (C) that "measures against running out of remaining reproduction time are to prevent the media rate b(t) from becoming too high compared with the transmission rate v(t)", corresponds to reducing the value of the objective function fQ as the value obtained by dividing the media rate b(t) by the transmission rate v(t) is smaller. As such, the item z3 is represented by the following Expression (6).

$$z3 = \{p(t)/T(t)\} \cdot \{b(t)/v(t)\}^2 \quad (6)$$

Here, p(t)/T(t) is a term for increasing the impact of the item z3 on the objective function fQ when the reproduction speed p(t) is high and the remaining reproduction time T(t) is short in the client device 200, while decreasing the impact of the item z3 on the objective function fQ when the remaining reproduction time T(t) is long and the reproduction speed p(t) is low.

The item z4, relating to the measures (D) that "measures against frequent changes of the media rate b(t) are to reduce the changes of the media rate b(t)", corresponds to reducing the value of the objective function fQ as the time rate of change (time-derivative value) of the media rate b(t) is smaller. As such, the item z4 is represented by the following Expression (7).

$$z4 = \{db(t)/d(t)\}^2 \quad (7)$$

In the present embodiment, the objective function fQ, to which the respective items z1 to z4 are weighted and added, is used as the objective function fQ for evaluating QoE. This objective function is represented by the following Expression (8).

$$fQ = a1 \cdot z1 + a2 \cdot z2 + a3 \cdot z3 + a4 \cdot z4 \quad (8)$$

It should be noted that in Expression (8), a1, a2, a3, and a4 are respectively weights to the items z1, z2, z3, and z4, which can be changed for each of the types of services and users.

[Evaluation of Delivery Cost]

The delivery cost is evaluated by the delivery cost evaluation means 102c of the rate output means 102.

The user of the client device 200 is free to stop viewing of content, and if the user stops viewing in the middle of the content, the media data, which is stored in the media reproduction buffer 202 of the client device 200 and not having been reproduced, is discarded. As such, if the user stops viewing in the middle of the content, it means that a delivery cost is made for delivering useless media data. On the other hand, if the remaining reproduction time T(t) in the media reproduction buffer 202 of the client device 200 is the same, as the media rate b(t) of the non-reproduced media data stored therein is larger, the quantity of stored media data is larger. This means that as the media rate b(t) is larger, the delivery cost is made for delivering larger quantity of useless media data. Accordingly, the delivery cost evaluation means 102c evaluates that the delivery cost is larger as the media rate b(t) is larger. More specifically, the delivery cost evaluation means 102c evaluates the delivery cost using an objective function fC in which the media rate b(t) is a variable and which determines the delivery cost to correspond to the variable, as shown in the following Expression (9). In Expression (9), w1 is a weight. Further, the value of the objective function fC becomes smaller as the delivery cost is smaller.

$$fC = w1 \cdot b(t)^2 \quad (9)$$

It should be noted that the above-described objective function fC for evaluating the delivery cost is just an example, and is not limited to this example. For example, as the objective function fC for evaluating the delivery cost, the following Expression (10) may be used.

$$fC = w1 \cdot b(t)^2 + w2 \cdot v(t)^2 \quad (10)$$

The first term "w1·b(t)²" on the right-hand side of Expression (10) is the same as the first term of Expression (9). Further, in the second term "w2·v(t)²" on the right-hand side of Expression (10), "w2" is a weight and "v(t)" is a transmission rate when media data is transmitted from the server device 100 to the client device 200. The second term "w2·v(t)²" on the right-hand side serves as follows in the objective function fC. The user of the client device 200 is free to stop viewing of the content, and if the user stops viewing in the middle of the content, the non-reproduced media data stored in the media reproduction buffer 202 is discarded. If the media rate b(t) of the non-reproduced media data to be discarded is the same, when the remaining reproduction time T(t) is longer, it means that more useless media data has been transmitted from the server device 100 to the client device 200. As such, it can be evaluated that as the remaining reproduction time T(t) is longer, the delivery cost is higher. Here, the remaining reproduction time T(t) can be shorter as the transmission rate v(t) is lower. Accordingly, the second term "w2·v(t)²" of the right-hand side acts to reduce the value of the objective function fC (acts to reduce the delivery cost) as the remaining reproduction time T(t) is shorter (acts to reduce the delivery cost).

Further, as the objective function fC for evaluating the delivery cost, the following Expression (11) can also be used. It should be noted that the first term "w2·v(t)²" on the right-hand side of Expression (11) is the same as the second term on the right-hand side of Expression (10).

$$fC = w2 \cdot v(t)^2 \quad (11)$$

[Optimum Combination of Media Rate and Transmission Rate]

With consideration of both the QoE and the delivery cost for each client device to which content is to be delivered, the optimum rate calculation means 102a calculates an optimum combination of a media rate b(t) and a transmission rate v(t) for media data to be delivered. More specifically, the optimum rate calculation means 102a calculates, among combinations of media rates b(t) and transmission rates v(t) satisfying predetermined constraints, a combination of a media rate b(t) and a transmission rate v(t) which minimizes the value of an objective function fT shown by the following Expression (12) (a combination of a media rate b(t) and a transmission rate v(t) which enables to make QoE as high as possible while reducing the delivery cost as much as possible).

$$fT = mq \cdot fQ + mc \cdot fC \quad (12)$$

In Expression (12), fQ is an objective function for evaluating QoE shown as Expression (8), and fC is any one of the objective functions for evaluating the delivery cost shown as Expressions (9) to (11). Further, mq and mc are weights to the values of the objective functions fQ and fC, respectively. Here, in the objective function fQ for evaluating the QoE, the media rate b(t) and the transmission rate v(t) are variables, while in the objective function fC for evaluating the delivery cost, one or both of the media rate b(t) and the transmission rate v(t) are variables. Accordingly, it can be said that the objective function fT shown as Expression (12) is a function in which the media rate b(t) and the transmission rate v(t) are variables, and which determines an evaluation value evaluating a combination of a delivery cost and QoE is determined so as to correspond to the variables. The weights mq and mc can be set freely by the manager or the like of the server device 100. For example, in the case of calculating an optimum combination of a media rate b(t) and a transmission rate v(t) with a higher emphasis on the QoE rather than the delivery cost, the weight mq is set to be larger relative to the weight mc, while in the case of calculating an optimum combination of a media rate b(t) and a transmission rate v(t) with a higher emphasis on the delivery cost rather than the QoE, the weight me is set to be higher relative to the weight mq.

Next, constraints used by the optimum rate calculation means 102a will be described. In the present embodiment, a first constraint and a second constraint are used.

The first constraint is a condition that "a transmission rate v(t) in the media data transmission means 104 of the server device 100 does not exceed an available bandwidth Th(t)". Here, as the available bandwidth Th(t), an available bandwidth shown by the reception information transmitted from the reception information acquisition means 204 of the client device 200 is used. By satisfying the first constraint, it is possible to reliably select a transmission rate not higher than the available bandwidth Th(t). As such, a packet loss can be prevented. It should be noted that as the first constraint includes the available bandwidth Th(t) shown by the reception information transmitted from the client device, it is unique to the client device. For example, in the case of obtaining a media rate and a transmission rate of a client device C1, a first constraint including the available bandwidth transmitted from the client device C1 must be used, and in the case of obtaining a media rate and a transmission rate of a client device C2, a first constraint including the available band transmitted from the client device C2 must be used.

The second constraint is a condition that "a media rate b(t) in the media data transmission means 104 of the server device 100 is any one of the predetermined n types of media rates b1, b2, . . . , bn. In the present embodiment, in the media data storing means 101, n pieces of media data encoded with the n types of media rates b1, b2, . . . , bn are stored for each piece of content.

It should be noted that the constraints are not limited to those described above. For example, it is possible to only use either the first constraint or the second constraint.

As described above, the optimum rate calculation means 102a calculates, for each client device to which content is to be delivered, a combination of a media rate b(t) and a transmission rate v(t) satisfying the first constraint and the second constraint and minimizing the value of the objective function fT. Here, while the media data is transmitted directly using the calculated media rate b(t) and the transmission rate v(t), in the present embodiment, the media rate b(t) and the transmission rate v(t) are adjusted based on the states of the server device 100 and the network NW, and media data is transmitted using the adjusted media rate bh(t) and the transmission rate vh(t), as described below. It should be noted that in the case of transmitting media data to the client device using the media rate b(t) and the transmission rate v(t) before adjustment, it is possible to achieve an advantageous effect of improving the QoE of each user as much as possible while reducing the delivery cost.

[Adjustment of Media Rate and Transmission Rate]

Next, adjustment processing of a media rate and a transmission rate will be described. The optimum rate calculation means 102a adjusts a media rate h(t) and a transmission rate v(t) for each client device to which content is to be delivered based on the states of the server device 100 and the network NW, and outputs the adjusted media rate bh(t) and the adjusted transmission rate vh(t) to the media packet generation means 103 and the media data transmission means 104 respectively. Adjustment based on the states of the server device 100 and the network NW will be described briefly below. If the CPU load on the server device 100 or the hand of the network NW is tight, the optimum rate calculation means 102a evaluates the delivery cost based on the states of the server device 100 and the network NW in such a manner that the delivery cost is higher compared with the case of having extra room relatively. Next, the optimum rate calculation means 102a calculates a weight (0≤weight≤1) to the media rate b(t) and the transmission rate v(t). The value of the weight becomes smaller as the delivery cost is higher. Then, the optimum rate calculation means 102a multiplies the media rate b(t) and the transmission rate v(t) by the weight respectively to thereby obtain the adjusted media rate bh(t) and the adjusted transmission rate vh(t).

For example, if the number of units of client devices to which the server device 100 delivers content simultaneously is Nc [units], the CPU load on the server device 100 is Ls [%], the available memory of the server device 100 is Ms [bytes], the entire quantity of communications transmitted from the server device 100 is Ts [bits/second], the quantity of data transfer involved in reading of media data from the media data storing means 101 is Td [bytes/second], the delivery cost Cs in the server device 100 is as shown by the following Expression (13).

$$Cs = k1 \cdot Nc + k2 \cdot Ls + k3 \cdot Ms + k4 \cdot Ts + k5 \cdot Td \quad (13)$$

Here, k1 to k5 are weights to the respective items, and are changeable for each of the service types and users. The delivery cost Cs shows that the delivery cost is higher as the values are larger.

Expression (13) shows that if the number of client devices 200 to which the server device 100 delivers content simultaneously is larger, the delivery cost is higher compared with the case where the number of client devices 200 to which the server device 100 delivers content simultaneously is smaller. Further, Expression (13) shows that the delivery cost is higher when the CPU load on the server device 100 is high so that the CPU has no extra capacity, when the available memory is small, when the entire quantity of communications from the server device 100 is large so that the communicable quantity is tight, when the quantity of data transfer involved in reading of media data is large so that data transfer is tight, and the like, compared with the case having extra capacity.

Further, when the entire network NW is in congestion (when the traffic volume is large), the optimum rate calculation means 102a has prepared a function which calculates a delivery cost larger than the case where the network is available, and by using the function, calculates the delivery cost Cn in the network NW. Then, by adding the delivery cost Cs and the delivery cost Cn, the optimum rate calculation means 102a calculates a delivery cost Ct=(Cs+Cn) corresponding to the states of the server device 100 and the network NW. It should be noted that if the congestion degree of the entire network NW is unknown, it is also possible to prepare a function which calculates different delivery costs depending on time zones, and using the delivery cost calculated by using the function as the delivery cost Cn in the network NW. For example, it is acceptable that as the network NW is not congested in the midnight, a smaller delivery cost is calculated, while as a larger number of people use the network NW from 21:00 to 22:00 at night, the delivery cost Cn of the entire network NW is calculated using a function which calculates a higher delivery cost Cn. Further, it is also possible to change the delivery cost depending on the location on the network where packets run through, rather than the congestion degree of the entire network. For example, as the delivery cost with respect to the client device 200 passing through the network link where the communication traffic is concentrated so that it may easily becomes a bottleneck link, a value calculated by multiplying the delivery cost Ct by a weight larger than "1" may be used.

It is also possible to multiply the delivery cost Ct by a weight corresponding to the service level of the user of the client device. For example, it is possible to multiply the delivery cost Ct of the free members by a weight larger than that multiplied to the delivery cost Ct of the paying members so that the paying members can view higher-quality content compared with the free members. Further, it is also possible to multiply the delivery cost Ct of the users of lower service levels by a weight larger than that multiplied to the delivery cost Ct of the users of higher service levels, or multiply a weight which is inversely proportional to the service fees.

When the optimum rate calculation means 102a calculates a delivery cost Ct, the optimum rate calculation means 102a calculates a weight W with respect to the media rate b(t) and the transmission rate v(t) using a function fAC(Ct) which monotonically decreases from 1 to 0.

Then, the optimum rate calculation means 102a performs operations shown in the following Expressions (14) and (15) to thereby calculate the adjusted media rate bh(t) and the adjusted transmission rate vh(t).

$$bh(t)=W \cdot b(t) \quad (14)$$

$$vh(t)=W \cdot v(t) \quad (15)$$

Then, the optimum rate calculation means 102a provides the media packet generation means 103 and the media data transmission means 104 with the adjusted media rate bh(t) and the adjusted transmission rate vh(t), respectively. The optimum rate calculation means 102a performs the above-described processing for each client device to which content is to be delivered. The details of the processing performed at step S002 are as described above. It should be noted that the method of calculating the delivery cost Ct and the method of calculating the weight using the function fAC(Ct) as described above are just examples, and are not limited to them.

When the media packet generation means 103 receives the media rate bh(t) from the optimum rate calculation means 102a, the media packet generation means 103 inputs media data encoded with the media rate bh(t) from the media data storing means 101 in which a plurality of pieces of media data encoded with different media rates are stored. Then, the media packet generation means 103 generates media packets based on the input media data, and provides the media data transmission means 104 with the generated media packets. It should be noted that media packet generation means 103 may transcode the media data input from the media data storing means 101 into media data of the media rate received from the optimum rate calculation means 102a. The media data transmission means 104 transmits the media packets provided by the media packet generation means 103 to the corresponding client device (e.g., client device 200) at the transmission rate vh(t) provided by the optimum rate calculation means 102a (step S003).

Regarding transmission of the media data at the calculated transmission rate, if it is transmitted using UDP/IP, it is only necessary to transmit the media packets in appropriate timing. For example, if media data is made into packets of 1500 bytes and transmitted at 300 kbps, as it is possible to transmit (300*1000)/(1500*8)=25 packets per second, transmission is controlled to transmit one packet per 40 milliseconds.

If transmission is performed using TCP/IP, as a packet transmission time cannot be controlled, the time to transmit the next packet is controlled based on the time taken for transmitting the previous packet. In the case of transmitting packets of 1500 bytes at 300 kbps, 1500 bytes are transmitted every 40 milliseconds. If 30 milliseconds have been taken for transmitting a packet of 1500 bytes, it is only necessary to control transmission such that the next packet of 1500 bytes is transmitted after waiting for 10 milliseconds (=40 milliseconds 30 milliseconds).

The above-described processing is repeated until the media data ends (step S004 in FIG. 3).

Effects of First Exemplary Embodiment

According to the present embodiment, it is possible to achieve an advantageous effect of improving QoE as much as possible while reducing the delivery cost. This is because the present embodiment is adapted to calculate a media rate and a transmission rate when delivering content by using an objective function which uses the media rate and the transmission rate of media data as variables and determines an evaluation value for evaluating a combination of QoE and a delivery cost so as to correspond to the variables.

Further, according to the present embodiment, it is possible to reduce the delivery cost while equally improving the QoE of the entire users utilizing the content delivery system. This is because the present embodiment is adapted to adjust the values of a media rate and a transmission rate calculated using an objective function such that the values become smaller as the load on the server device and the network congestion are tighter, and deliver media data using the adjusted media rate and the adjusted transmission rate. As such, it is possible to prevent a situation where particular users use a large number of resources.

Second Exemplary Embodiment

Figure 4:
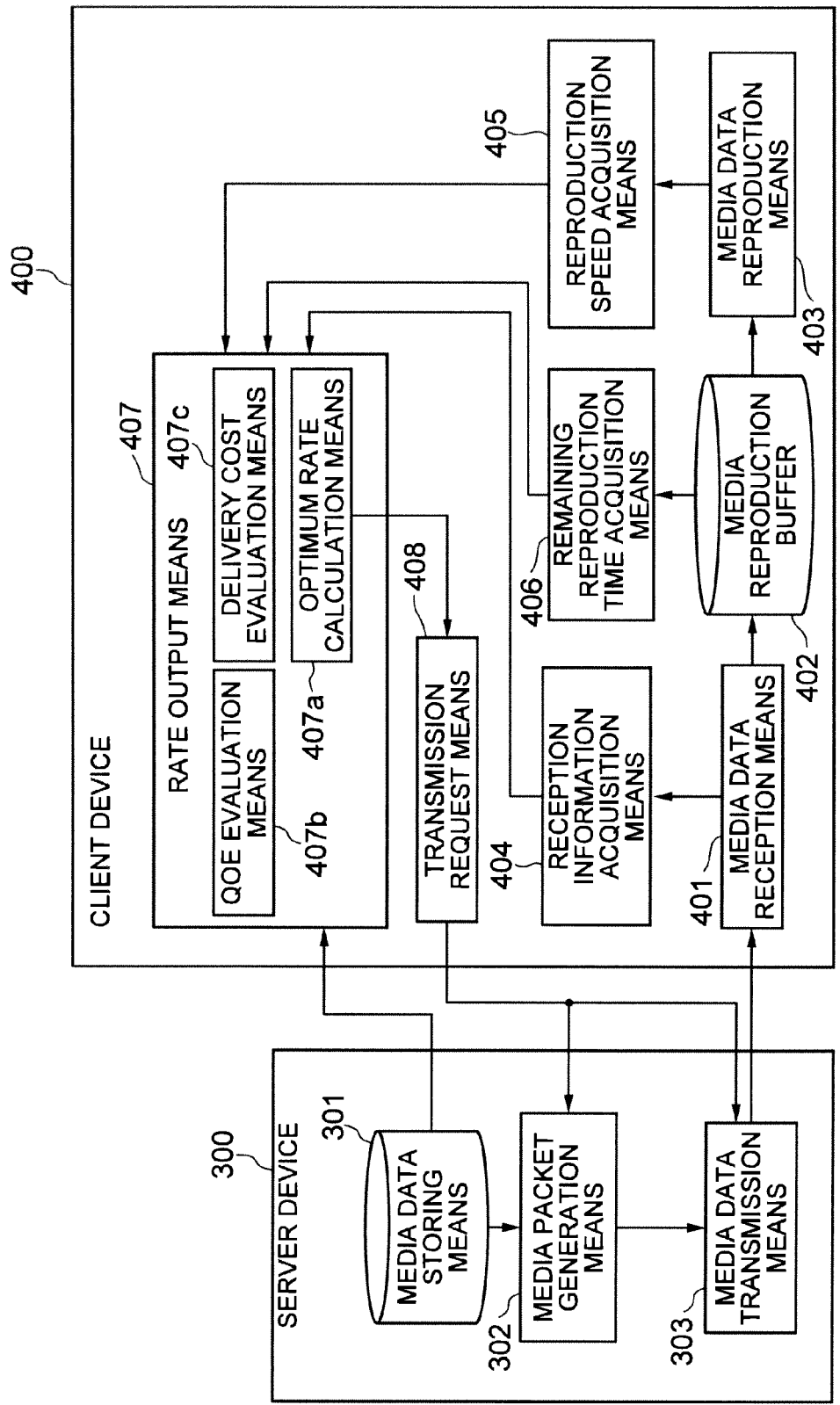
FIG. 4 is a block diagram showing functions of a content delivery system according to a second exemplary embodiment of the present invention.

Next, a second exemplary embodiment of the present invention will be described in detail with reference to FIG. 4.

The present embodiment is different from the content delivery system of the first exemplary embodiment in that a client device 400 includes a rate output means 407, and selects an optimum combination of a media rate and a transmission rate in the client device 400. Hereinafter, description will be given below focusing on such a difference.

The content delivery system according to the second exemplary embodiment includes a server device 300 and the client device 400. The server device 300 and the client device 400 are connected communicably with each other over a network.

The server device 300 includes a media data storing means 301, a media packet generation means 302, and a media data transmission means 303.

Further, the client device 400 includes a media data reception means 401, a media reproduction buffer 402, a media data reproduction means 403, a reception information acquisition means 404, a reproduction speed acquisition means 405, a remaining reproduction time acquisition means 406, a rate output means 407, and a transmission request means 408. Further, the rate output means 407 includes an optimum rate calculation means 407a, a QoE evaluation means 407b, and a delivery cost evaluation means 407c.

The media data storing means 301, the media packet generation means 302, and the media data transmission means 303 of the server device 300 have functions similar to those of the media data storing means 101, the media packet generation means 103, and the media data transmission means 104 of the first exemplary embodiment, respectively.

The means 401 to 408 of the client device 400 operate as follows, respectively.

The media data reception means 401, the media reproduction buffer 402, the media data reproduction means 403, the reception information acquisition means 404, the reproduction speed acquisition means 405, the remaining reproduction time acquisition means 406, the rate output means 407, the optimum rate calculation means 407a, the QoE evaluation means 407b, and the delivery cost evaluation means 407c have functions similar to those of the media data reception means 201, the media reproduction buffer 202, the media data reproduction means 203, the reception information acquisition means 204, the reproduction speed acquisition means 205, the remaining reproduction time acquisition means 206, the rate output means 102, the optimum rate calculation means 102a, the QoE evaluation means 102b, and the delivery cost evaluation means 102c of the first exemplary embodiment, respectively.

The transmission request means 408 requests the server device 300 to deliver media data of a media rate calculated by the rate output means 407, at a transmission rate calculated by the rate output means 407.

The media packet generation means 302 of the server device 300 reads the media data of the media rate, requested by the client device 400, from the media data storing means 301, or transforms the media rate of the media data read from the media data storing means 301 into the requested media rate. Then, based on the readout or transformed media data, the media packet generation means 302 generates media packets, and provides the media data transmission means 303 with the generated media packets.

The media data transmission means 303 transmits the media packets, provided by the media packet generation means 302, to the client device 400 at the transmission rate requested by the client device 400.

Effects of Second Exemplary Embodiment

According to the present embodiment, it is possible to achieve an advantageous effect that the load on the server device 300 is reduced, in addition to the advantageous effects achieved in the first exemplary embodiment. This is because the rate output means 407 is provided to the client device 400.

Third Exemplary Embodiment

Next, a third exemplary embodiment of the present invention will be described with reference to the drawings.

A content delivery system of the third exemplary embodiment is different from the content delivery system of the first exemplary embodiment in that a relay device, which transfers media data from a server device to a client device, acquires reception information, and transmits the acquired reception information to the server device.

Figure 5:
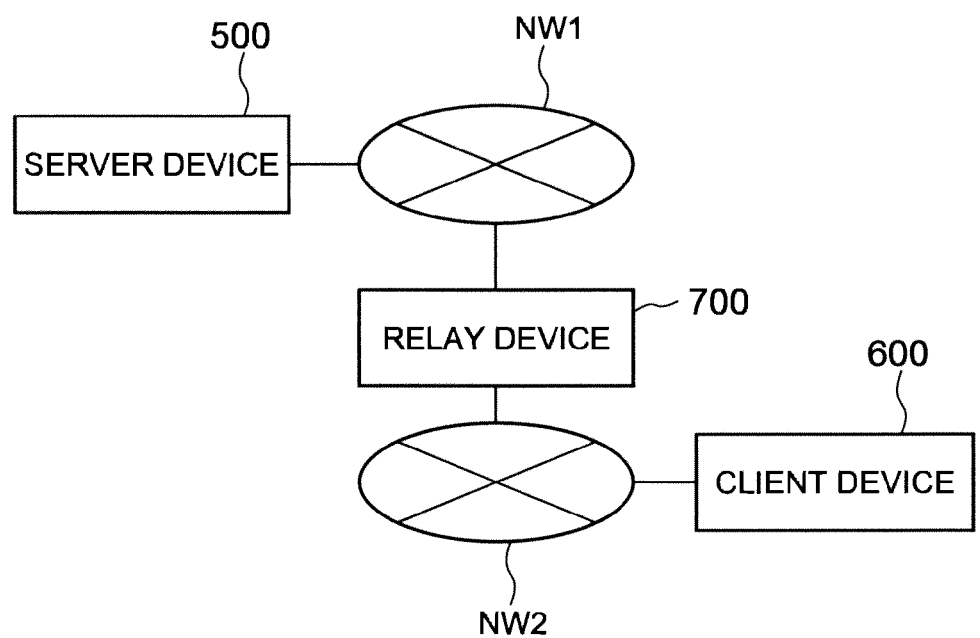
FIG. 5 is a block diagram showing the schematic configuration of a content delivery system according to a third exemplary embodiment of the present invention.

As shown in FIG. 5, the content delivery system of the present embodiment includes a server device 500, a client device 600, and a relay device 700. The server device 500 and the relay device 700 are communicably connected with each other over a first network NW1, and the relay device 700 and the client device 600 are communicably connected with each other over a second network NW2.

In an example of the present embodiment, the client device 600 may be a mobile telephone, a smartphone, or a tablet connected to a mobile telephone network, and the relay device 700 may be a base station device. In that case, the first network NW1 may be the Internet or a core network of a telecom operator, and the second network NW2 may be a wireless network for mobile telephones.

In another example, the client device 600 may be a PC, a TV receiver, or a set top box connected within home, and the relay device 700 may be a home gateway or a broadband router. Further, the first network NW1 may be the Internet or an access network or a core network of a telecom operator, and the second network NW2 may be a wired or wireless network within home. These are just examples, without any limitation.

The relay device 700 includes a central processing unit (CPU) and storing units (memory and hard disk drive (HDD)). The relay device 700 is adapted to realize functions described below by means of execution of a program, stored in the storing units, by the CPU.

Figure 6:
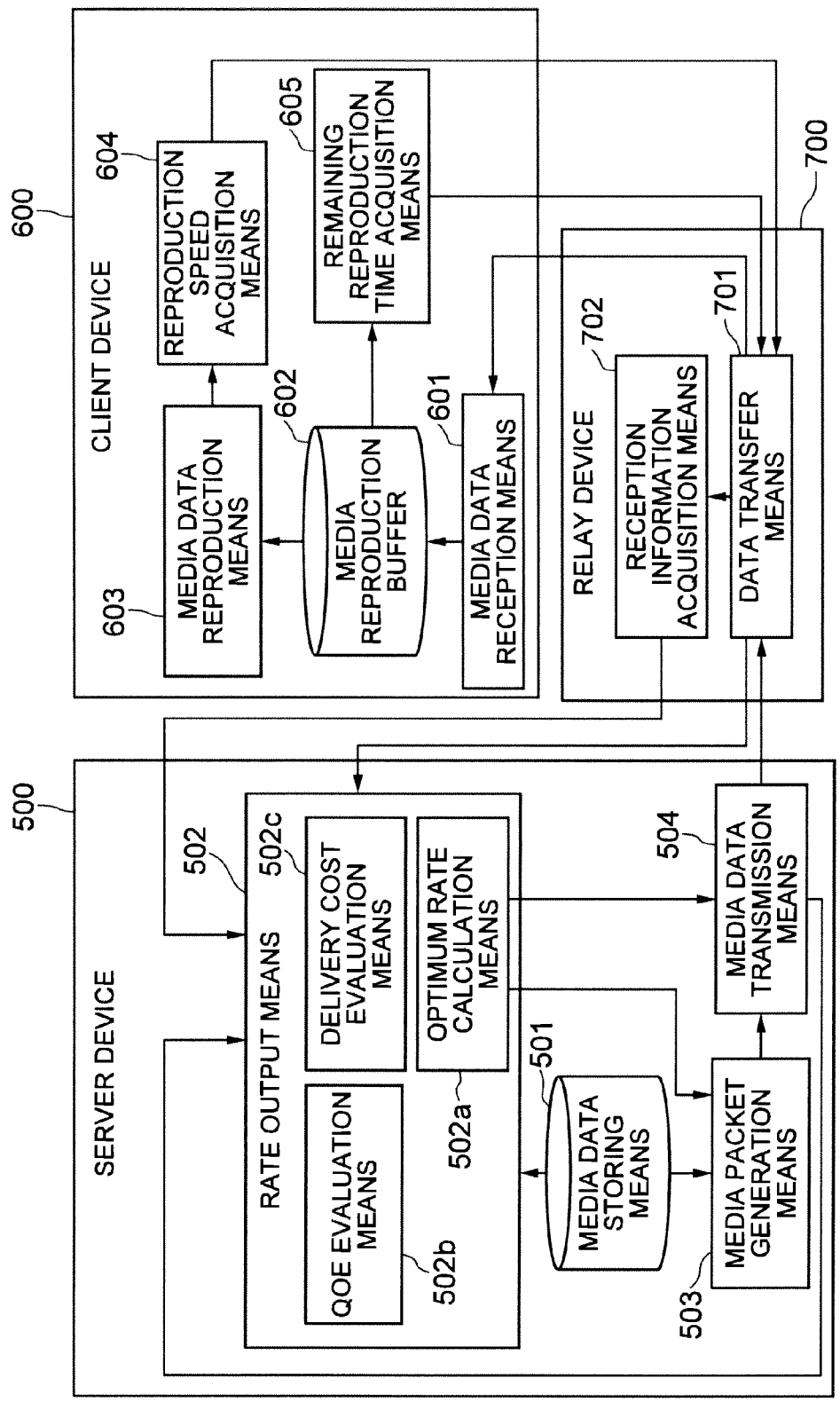
FIG. 6 is a block diagram showing functions of the content delivery system according to the third exemplary embodiment of the present invention.

FIG. 6 is a block diagram showing functions of the delivery system configured as described above. The present embodiment is different from the content delivery system of the first exemplary embodiment in that the relay device 700 is added. Hereinafter, description will be given below focusing on such a difference.

The server device 500 includes a media data storing means 501, a rate output means 502, a media packet generation means 503, and a media data transmission means 504. The rate output means 502 includes an optimum rate calculation means 502a, a QoE evaluation means 502b, and a delivery cost evaluation means 502c.

The media data storing means 501, the rate output means 502, the media packet generation means 503, the media data transmission means 504, the optimum rate calculation means 502a, the QoE evaluation means 502b, and the delivery cost evaluation means 502c of the server device 500 have functions similar to those of the media data storing means 101, the rate output means 102, the media packet generation means 103, the media data transmission means 104, the optimum rate calculation means 102a, the QoE evaluation means 102b, and the delivery cost evaluation means 102c of the first exemplary embodiment, respectively.

Further, the client device 600 includes a media data reception means 601, a media reproduction buffer 602, a media data reproduction means 603, a reproduction speed acquisition means 604, and a remaining reproduction time acquisition means 605.

The media data reception means 601, the media reproduction buffer 602, the media data reproduction means 603, the reproduction speed acquisition means 604, and the remaining reproduction time acquisition means 605 of the client device 600 have functions similar to those of the media data reception means 201, the media reproduction buffer 202, the media data reproduction means 203, the reproduction speed acquisition means 205, and the remaining reproduction time acquisition means 206 of the first exemplary embodiment, respectively.

The relay device 700 includes a data transfer means 701 and a reception information acquisition means 702.

The means 701 and 702 of the relay device 700 operate as follows, respectively.

The data transfer means 701 transfers data for the client device 600, transmitted from the server device 500, to the client device 600, and transfers data for the server device 500, transmitted from client device 600, to the server device 500. The data transmitted from the server device 500 and transferred to the client device 600 includes media data. The data transmitted from the client device 600 and transferred to the server device 500 includes data of a reproduction speed, a remaining reproduction time, and others such as a client state.

The reception information acquisition means 702 transmits, to the server device 500, a value calculated by dividing the quantity of media data, sequentially transmitted by the data transfer means 701 from the server device 500 to the client device 600, by the transfer time period of the media data, as reception information of the client device 600. For example, if the data transfer means 701 sequentially transfers media data of "0.5 megabytes" in "0.5 seconds" from the server device 500 to the client device 600, and then it cannot receive the media data from the server device 500 for a given period and cannot execute transfer processing, reception information is 0.5 megabytes/0.5 seconds=1 (megabytes/second). It should be noted that acquisition processing of reception information is performed every predetermined time. While it is assumed that transfer of the media data is performed using TCP/IP, it is also possible to use UDP/IP rather than TCP/IP. In the case of using UDP/IP, there is a possibility that media packets transmitted from the server device 500 are lost and cannot be received by the media data reception means 601. In that case, a rate of loss of media packets (rate of occurrence of packet loss) lost between the server device 500 and the relay device 700, and a rate of loss of media packets lost between the relay device 700 and the client device 600, are also acquired. For example, in the case of using RTP, a rate of packet loss is calculated by specifying the lost packets based on the sequence number included in the RTP header. If the network NW2, to which the relay device 700 is connected, is a mobile telephone network and it is possible to measure the state of radio wave signals between it and the client device 600, it is acceptable to acquire a state such as a state of radio wave signals between it and the client device 600. The reception information acquisition means 702 transfers the acquired reception information to the server device 500.

Effects of Third Exemplary Embodiment

According to the present embodiment, it is possible to achieve an advantageous effect that the configuration of a client device can be simplified, in addition to the advantageous effects achieved by the first exemplary embodiment, because the reception information acquisition means 702 is provided to the relay device 700.

Fourth Exemplary Embodiment

Next, a fourth exemplary embodiment of the present invention will be described with reference to the drawings.

Figure 7:
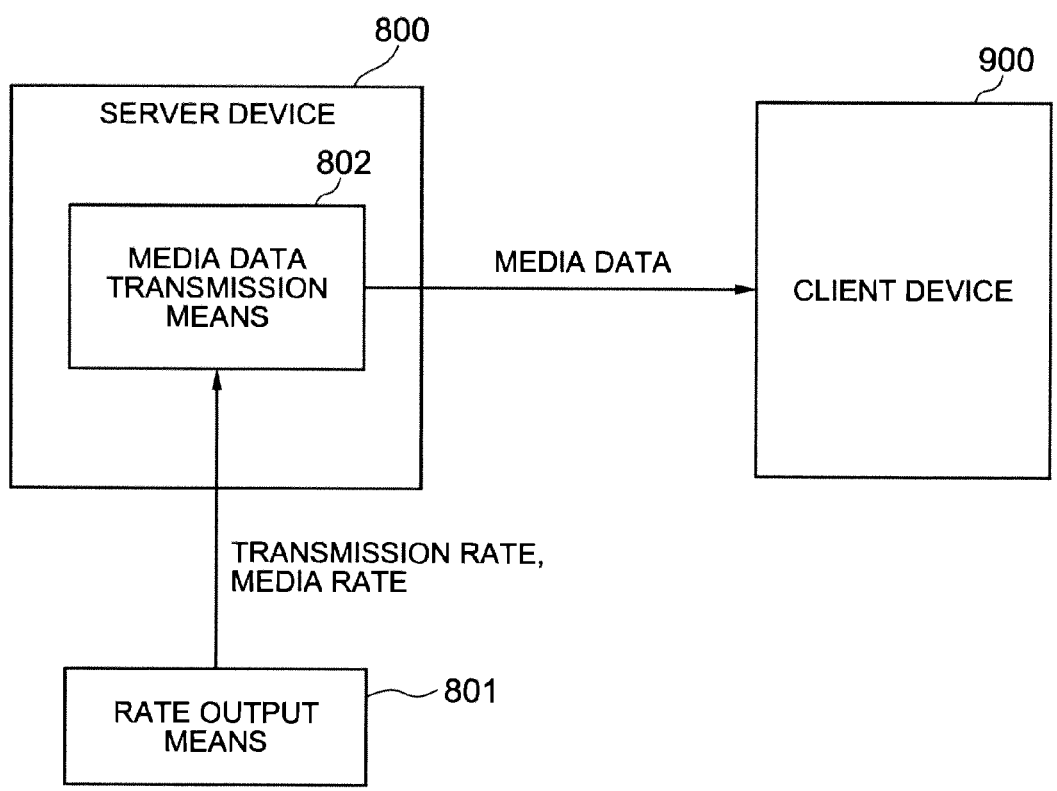
FIG. 7 is a block diagram showing functions of a content delivery system according to a fourth exemplary embodiment of the present invention.

Referring to FIG. 7, a content delivery system of the present embodiment includes a server device 800 and a client device 900 which are communicably connected with each other. The server device 800 is adapted to be able to transmit media data, formed by encoding content, to the client device 900. The client device 900 is adapted to, while receiving media data transmitted from the server device 800, store received data of the media data in a media reproduction buffer, read stored media data store from the media reproduction buffer, and reproduce the content.

Further, the content delivery system of the present embodiment also includes a rate output means 801 and a media data transmission means 802.

The rate output means 801 calculates and outputs a combination of a transmission rate and a media rate based on an objective function. The objective function is a function which uses a transmission rate, representing the quantity of media data to be transmitted per unit time by the server device 800, and a media rate, representing the quantity of media data per unit time, as variables, and determines an evaluation value evaluating a combination of QoE, which is a service quality that a user of the client device 900 experiences when viewing the content reproduced by the client device 900, and a delivery cost representing the cost involved in delivering the media data so as to correspond to the variables.

Further, the media data transmission means 802 transmits the media data, encoded at the media rate output from the rate output means 801, from the server device 800 to the client device 900 at the transmission rate output from the rate output means 801.

Effects of Fourth Exemplary Embodiment

According to the present embodiment, it is possible to achieve an advantageous effect of improving QoE as much as possible while reducing the delivery cost. This is because a media rate and a transmission rate, when delivering content, is calculated using an objective function which uses the media rate and the transmission rate of the media data as variables and determines an evaluation value evaluating a combination of QoE and the delivery cost so as to correspond to the variables.

The whole or part of the exemplary embodiments disclosed above can be described as, but not limited to, the following supplementary notes.

(Supplementary Note 1)

A content delivery system comprising a server device and a client device which are adapted to be communicable with each other, wherein the server device is adapted to be able to transmit media data, formed by encoding content, to the client device, the client device is adapted to, while receiving the media data transmitted by the server device, store received data of the media data in a media reproduction buffer, read stored media data from the media reproduction buffer, and reproduce the content, and the content delivery system further comprises:

rate output means for calculating and outputting a combination of a transmission rate and a media rate based on an objective function, the transmission rate representing a quantity of the media data transmitted per unit time by the server device, the media rate representing a quantity of the media data per unit time, the objective function using the transmission rate and the media rate as variables and determining an evaluation value evaluating a combination of QoE (Quality of Experience), which is a service quality that a user of the client device experiences when viewing the content reproduced by the client device, and a delivery cost representing a cost involved in delivering the media data so as to correspond to the variables; and media data transmission means for transmitting the media data, encoded at the media rate output from the rate output means, from the server device to the client device at the transmission rate output from the rate output means.

(Supplementary Note 2)

The content delivery system, according to supplementary note 1, wherein the objective function is set such that the delivery cost becomes higher as the media rate is higher.

(Supplementary Note 3)

The content delivery system, according to supplementary note 1 or 2, wherein the objective function is set such that the delivery cost becomes lower as the transmission rate is lower.

(Supplementary Note 4)

The content delivery system, according to any of supplementary notes 1 to 3, wherein the objective function is set such that the delivery cost becomes higher as a remaining reproduction time is longer, the remaining reproduction time being a period of time in which the content is able to be reproduced by the media data stored in the media reproduction buffer and not having been reproduced.

(Supplementary Note 5)

The content delivery system, according to any of supplementary notes 1 to 4, wherein the rate output means adjusts the calculated transmission rate and the calculated media rate such that values of the calculated transmission rate and the calculated media rate become smaller as a load placed on the server device is higher, and outputs the adjusted transmission rate and the adjusted media rate.

(Supplementary Note 6)

The content delivery system, according to any of supplementary notes 1 to 5, wherein the rate output means adjusts the calculated transmission rate and the calculated media rate such that values of the calculated transmission rate and the calculated media rate become smaller as a congestion degree of a network connecting the server device and the client device is higher, and outputs the adjusted transmission rate and the adjusted media rate.

(Supplementary Note 7)

The content delivery system, according to any of supplementary notes 1 to 6, wherein the rate output means adjusts the calculated transmission rate and the calculated media rate such that values of the calculated transmission rate and the calculated media rate become smaller in a time zone during which a congestion degree of a network connecting the server device and the client device is expected to be higher, and outputs the adjusted transmission rate and the adjusted media rate.

(Supplementary Note 8)

The content delivery system, according to any of supplementary notes 1 to 7, wherein the rate output means adjusts the calculated transmission rate and the calculated media rate such that values of the calculated transmission rate and the calculated media rate become smaller as a service level of the user of the client device is lower, and outputs the adjusted transmission rate and the adjusted media rate.

(Supplementary Note 9)

The content delivery system, according to any of supplementary notes 1 to 8, wherein the objective function is set such that the QoE becomes higher as the transmission rate is lower.

(Supplementary Note 10)

The content delivery system, according to any of supplementary notes 1 to 9, wherein the objective function is set such that the QoE becomes higher as the media rate is higher.

(Supplementary Note 11)

The content delivery system, according to any of supplementary notes 1 to 10, wherein the objective function is set such that the QoE becomes higher as frequency of changes of the media rate is lower.

(Supplementary Note 12)

The content delivery system, according to any of supplementary notes 1 to 11, wherein the objective function is set such that the QoE becomes higher as a remaining reproduction time is longer, the remaining reproduction time being a period of time in which the content is able to be reproduced by the media data stored in the media reproduction buffer and not having been reproduced.

(Supplementary Note 13)

The content delivery system, according to any of supplementary notes 1 to 12, wherein the rate output means is adapted to output, among combinations of the transmission rates and the media rates satisfying predetermined constraints, a combination of a transmission rate and a media rate with which the evaluation value, corresponding thereto by the objective function, is the highest.

(Supplementary Note 14)

A server device adapted to be communicable with a client device and to be able to transmit media data, formed by encoding content, to the client device, the server device comprising:

rate output means for calculating and outputting a combination of a transmission rate and a media rate based on an objective function, the transmission rate representing a quantity of the media data transmitted per unit time by the server device, the media rate representing a quantity of the media data per unit time, the objective function using the transmission rate and the media rate as variables and determining an evaluation value evaluating a combination of QoE (Quality of Experience), which is a service quality that a user of the client device experiences when viewing the content reproduced by the client device, and a delivery cost representing a cost involved in delivering the media data so as to correspond to the variables; and media data transmission means for transmitting the media data, encoded at the media rate output from the rate output means, from the server device to the client device at the transmission rate output from the rate output means.

(Supplementary Note 15)

The server device, according to supplementary note 14, wherein the objective function is set such that the delivery cost becomes higher as the media rate is higher.

(Supplementary Note 16)

The server device, according to supplementary note 14 or 15, wherein
the objective function is set such that the delivery cost becomes lower as the transmission rate is lower.

(Supplementary Note 17)

A client device adapted to be communicable with a server device and, while receiving media data transmitted by the server device, store received data of the media data in a media reproduction buffer, read stored media data from the media reproduction buffer, and reproduce content, the client device comprising
rate output means for calculating and outputting a combination of a transmission rate and a media rate based on an objective function, the transmission rate representing a quantity of the media data transmitted per unit time by the server device, the media rate representing a quantity of the media data per unit time, the objective function using the transmission rate and the media rate as variables and determining an evaluation value evaluating a combination of QoE (Quality of Experience), which is a service quality that a user of the client device experiences when viewing the content reproduced by the client device, and a delivery cost representing a cost involved in delivering the media data so as to correspond to the variables.

(Supplementary Note 18)

The client device, according to supplementary note 17, wherein
the objective function is set such that the delivery cost becomes higher as the media rate is higher.

(Supplementary Note 19)

The client device, according to supplementary note 17 or 18, wherein
the objective function is set such that the delivery cost becomes lower as the transmission rate is lower.

(Supplementary Note 20)

A delivery method to be applied to a content delivery system including a server device and a client device which are adapted to be communicable with each other, the server device being adapted to be able to transmit media data, formed by encoding content, to the client device, the client device being adapted to, while receiving the media data transmitted by the server device, store received data of the media data in a media reproduction buffer, read stored media data from the media reproduction buffer, and reproduce the content, the method comprising:
calculating and outputting a combination of a transmission rate and a media rate based on an objective function, the transmission rate representing a quantity of the media data transmitted per unit time by the server device, the media rate representing a quantity of the media data per unit time, the objective function using the transmission rate and the media rate as variables and determining an evaluation value evaluating a combination of QoE (Quality of Experience), which is a service quality that a user of the client device experiences when viewing the content reproduced by the client device, and a delivery cost representing a cost involved in delivering the media data so as to correspond to the variables; and
transmitting the media data, encoded at the output media rate, from the server device to the client device at the output transmission rate.

(Supplementary Note 21)

The delivery method, according to supplementary note 20, wherein
the objective function is set such that the delivery cost becomes higher as the media rate is higher.

(Supplementary Note 22)

The delivery method, according to supplementary note 20 or 21, wherein
the objective function is set such that the delivery cost becomes lower as the transmission rate is lower.

(Supplementary Note 23)

A computer-readable medium storing a program for causing a computer to function as a server device, the program causing the computer to function as:
rate output means for calculating and outputting a combination of a transmission rate and a media rate based on an objective function, the transmission rate representing a quantity of the media data transmitted per unit time by the server device, the media rate representing a quantity of the media data per unit time, the objective function using the transmission rate and the media rate as variables and determining an evaluation value evaluating a combination of QoE (Quality of Experience), which is a service quality that a user of a client device experiences when viewing the content reproduced by the client device, and a delivery cost representing a cost involved in delivering the media data so as to correspond to the variables; and
media data transmission means for transmitting the media data, encoded at the media rate output from the rate output means, from the server device to the client device at the transmission rate output from the rate output means.

(Supplementary Note 24)

A computer-readable medium storing a program for causing a computer to function as a client device, the program causing the computer to function as:
reproduction means for, while receiving media data transmitted by a server device, storing received data of the media data in a media reproduction buffer, reading stored media data from the media reproduction buffer, and reproducing content; and
rate output means for calculating and outputting a combination of a transmission rate and a media rate based on an objective function, the transmission rate representing a quantity of the media data transmitted per unit time by the server device, the media rate representing a quantity of the media data per unit time, the objective function using the transmission rate and the media rate as variables and determining an evaluation value evaluating a combination of QoE (Quality of Experience), which is a service quality that a user of a client device experiences when viewing the content reproduced by the client device, and a delivery cost representing a cost involved in delivering the media data so as to correspond to the variables.

While the present invention has been described with reference to the exemplary embodiments described above, the present invention is not limited to the above-described embodiments. The form and details of the present invention can be changed within the scope of the present invention in various manners that can be understood by those skilled in the art.

Further, while the programs of the above-described embodiments are stored in storing units, they may be stored in computer-readable recording media. For example, recording media are portable media including flexible disks, optical disks, magneto-optical disks, and semiconductor memories.

INDUSTRIAL APPLICABILITY

The present invention is applicable to, for example, a content delivery system including a server device which transmits media data representing content and a client device which receives media data from the server device and reproduces it.

REFERENCE NUMERALS 100 server device
101 media data storing means
102 rate output means
102a optimum rate calculation means
102b QoE evaluation means
102c delivery cost evaluation means
103 media packet generation means
104 media data transmission means
200 client device
201 media data reception means
202 media reproduction buffer
203 media data reproduction means
204 reception information acquisition means
205 reproduction speed acquisition means
206 remaining reproduction time acquisition means
300 server device
301 media data storing means
302 media packet generation means
303 media data transmission means
400 client device
401 media data reception means
402 media reproduction buffer
403 media data reproduction means
404 reception information acquisition means
405 reproduction speed acquisition means
406 remaining reproduction time acquisition means
407 rate output means
407a optimum rate calculation means
407b QoE evaluation means
407c delivery cost evaluation means
408 transmission request means
500 server device
501 media data storing means
502 rate output means
502a optimum rate calculation means
502b QoE evaluation means
502c delivery cost evaluation means
503 media packet generation means
504 media data transmission means
600 client device
601 media data reception means
602 media reproduction buffer
603 media data reproduction means
604 reproduction speed acquisition means
605 remaining reproduction time acquisition means
700 relay device
701 data transfer means
702 reception information acquisition means
800 server device
801 rate output means
802 media data transmission means
900 client device

The invention claimed is:

1. A content delivery system comprising a server device and a client device which are adapted to be communicable with each other, wherein
the server device is configured to transmit media data, formed by encoding content, to the client device,
the client device is configured to, while receiving the media data transmitted by the server device, store received data of the media data in a media reproduction buffer, read stored media data from the media reproduction buffer, and reproduce the content, and
the content delivery system further comprises:
a rate output unit that calculates and outputs a combination of a transmission rate and a media rate based on a third objective function that is obtained by weighting addition of a first objective function and a second objective function, the transmission rate representing a quantity of the media data transmitted per unit time by the server device, the media rate representing a quantity of the media data per unit time, the first objective function using the transmission rate and the media rate as variables, the second objective function using one or both of the transmission rate and the media rate as variables or a variable, and the third objective function determining an evaluation value evaluating a combination of Quality of Experience (QoE), which is a service quality that a user of the client device experiences when viewing the content reproduced by the client device, and a delivery cost representing a cost involved in delivering the media data so as to correspond to the variables; and
a media data transmission unit that transmits the media data, encoded at the media rate outputted from the rate output unit, from the server device to the client device at the transmission rate outputted from the rate output unit.

2. The content delivery system, according to claim 1, wherein the second objective function is set such that the delivery cost becomes higher as the media rate is higher.

3. The content delivery system, according to claim 1, wherein the second objective function is set such that the delivery cost becomes lower as the transmission rate is lower.

4. The content delivery system, according to claim 1, wherein the second objective function is set such that the delivery cost becomes higher as a remaining reproduction time is longer, the remaining reproduction time being a period of time in which the content is able to be reproduced by the media data stored in the media reproduction buffer and not having been reproduced.

5. The content delivery system, according to claim 1, wherein the rate output unit adjusts the calculated transmission rate and the calculated media rate such that values of the calculated transmission rate and the calculated media rate become smaller as a load placed on the server device is higher, and outputs the adjusted transmission rate and the adjusted media rate.

6. The content delivery system, according to claim 1, wherein the rate output unit adjusts the calculated transmission rate and the calculated media rate such that values of the calculated transmission rate and the calculated media rate become smaller as a congestion degree of a network connecting the server device and the client device is higher, and outputs the adjusted transmission rate and the adjusted media rate.

7. The content delivery system, according to claim 1, wherein the rate output unit adjusts the calculated transmission rate and the calculated media rate such that values of the calculated transmission rate and the calculated media rate become smaller in a time zone during which a congestion degree of a network connecting the server device and the client device is expected to be higher, and outputs the adjusted transmission rate and the adjusted media rate.

8. A server device adapted to be communicable with a client device and to be able to transmit media data, formed by encoding content, to the client device, the server device comprising:

a rate output unit that calculates and outputs a combination of a transmission rate and a media rate based on a third objective function that is obtained by weighting addition of a first objective function and a second objective function, the transmission rate representing a quantity of the media data transmitted per unit time by the server device, the media rate representing a quantity of the media data per unit time, the first objective function using the transmission rate and the media rate as variables, the second objective function using one or both of the transmission rate and the media rate as variables or a variable, and the third objective function determining an evaluation value evaluating a combination of Quality of Experience (QoE), which is a service quality that a user of the client device experiences when viewing the content reproduced by the client device, and a delivery cost representing a cost involved in delivering the media data so as to correspond to the variables; and a media data transmission unit that transmits the media data, encoded at the media rate outputted from the rate output unit, from the server device to the client device at the transmission rate outputted from the rate output unit.

9. A client device adapted to be communicable with a server device and, while receiving media data transmitted by the server device, store received data of the media data in a media reproduction buffer, read stored media data from the media reproduction buffer, and reproduce content, the client device comprising a rate output unit that calculates and outputs a combination of a transmission rate and a media rate based on a third objective function that is obtained by weighting addition of a first objective function and a second objective function, the transmission rate representing a quantity of the media data transmitted per unit time by the server device, the media rate representing a quantity of the media data per unit time, the first objective function using the transmission rate and the media rate as variables, the second objective function using one or both of the transmission rate and the media rate as variables or a variable, and the third objective function determining an evaluation value evaluating a combination of Quality of Experience (QoE), which is a service quality that a user of the client device experiences when viewing the content reproduced by the client device, and a delivery cost representing a cost involved in delivering the media data so as to correspond to the variables.

10. A delivery method to be applied to a content delivery system including a server device and a client device which are adapted to be communicable with each other, the server device being adapted to be able to transmit media data, formed by encoding content, to the client device, the client device being adapted to, while receiving the media data transmitted by the server device, store received data of the media data in a media reproduction buffer, read stored media data from the media reproduction buffer, and reproduce the content, the method comprising:

calculating and outputting a combination of a transmission rate and a media rate based on a third objective function that is obtained by weighting addition of a first objective function and a second objective function, the transmission rate representing a quantity of the media data transmitted per unit time by the server device, the media rate representing a quantity of the media data per unit time, the first objective function using the transmission rate and the media rate as variables, the second objective function using one or both of the transmission rate and the media rate as variables or a variable, and the third objective function determining an evaluation value evaluating a combination of Quality of Experience (QoE), which is a service quality that a user of the client device experiences when viewing the content reproduced by the client device, and a delivery cost representing a cost involved in delivering the media data so as to correspond to the variables; and transmitting the media data, encoded at the output media rate, from the server device to the client device at the output transmission rate.

* * * * *